(12) United States Patent
Lewis

(10) Patent No.: US 10,963,594 B2
(45) Date of Patent: Mar. 30, 2021

(54) DETECTING PHYSICAL PENETRATION OF SECURE DEVICE

(71) Applicant: ENTIT SOFTWARE LLC, Sanford, NC (US)

(72) Inventor: John Martin Lewis, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 419 days.

(21) Appl. No.: 16/069,673

(22) PCT Filed: Jan. 21, 2016

(86) PCT No.: PCT/US2016/014314
§ 371 (c)(1),
(2) Date: Jul. 12, 2018

(87) PCT Pub. No.: WO2017/127083
PCT Pub. Date: Jul. 27, 2017

(65) Prior Publication Data
US 2019/0080121 A1    Mar. 14, 2019

(51) Int. Cl.
*G01D 5/24*     (2006.01)
*G06F 21/85*   (2013.01)
*G06F 21/82*   (2013.01)
*G06F 21/86*   (2013.01)

(52) U.S. Cl.
CPC .............. *G06F 21/85* (2013.01); *G01D 5/24* (2013.01); *G06F 21/82* (2013.01); *G06F 21/86* (2013.01); *G06F 2221/2121* (2013.01)

(58) Field of Classification Search
CPC ... G01R 27/2605; G06F 3/0428; G06F 3/044; G06F 3/0441; G06F 3/0442; G06F 3/0443; G06F 3/0444; G06F 3/0445; G06F 3/0446; G06F 3/0447; G06F 3/0448
See application file for complete search history.

(56) References Cited

U.S. PATENT DOCUMENTS

| | | |
|---|---|---|
| 5,159,316 A | 10/1992 | Lazzara |
| 5,568,610 A | 10/1996 | Brown |
| 6,983,378 B1 | 1/2006 | Kokubo |
| 8,226,442 B2 | 7/2012 | Uusimaki et al. |
| 8,687,371 B2 | 4/2014 | Arshad et al. |
| 8,947,106 B2 | 2/2015 | Michaelis et al. |
| 2006/0077065 A1 | 4/2006 | Bassilious |
| 2007/0186667 A1* | 8/2007 | Deangelis ............ G01D 5/2405 73/780 |
| 2010/0327856 A1 | 12/2010 | Lowy |
| 2012/0062241 A1 | 3/2012 | Rossi |
| 2012/0065908 A1 | 3/2012 | Rossi |
| 2017/0371442 A1* | 12/2017 | Ningrat ................... G06F 3/044 |

OTHER PUBLICATIONS

International Searching Authority., International Search Report and Written Opinion dated Oct. 5, 2016 for PCT Application No. PCT/US2016/014314 Filed Jan. 21, 2016 13 pages.

* cited by examiner

*Primary Examiner* — Tung X Nguyen

(57) ABSTRACT

An example device in accordance with an aspect of the present disclosure includes an interleaved connector including a plurality of layers of conducting material interspersed with insulating material. A plurality of electrodes are to identify a change in capacitance of the interleaved connector to indicate a penetration of the device.

15 Claims, 4 Drawing Sheets

DETECTING PHYSICAL PENETRATION OF SECURE DEVICE

BACKGROUND

Computing devices can be used to store and protect data. Devices can use protections against network intrusions, as well as against physical penetrations. For example, banking and financial security markets may impose physical security standards, such as payment card industry (PCI) and/or federal information processing standard (FIPS), which detail a level of physical security to be used with computing devices that deal with encrypted data. Such standards can impose higher manufacturing costs.

BRIEF DESCRIPTION OF THE DRAWINGS/FIGURES

DETAILED DESCRIPTION

Attempts to breach and/or penetrate physical security of a computing device, such as a device dealing with secure and/or encrypted data, should be detected and responded to quickly, to minimize the time that an attacker has to retrieve any sensitive data. To address such issues, examples described herein may identify a change in capacitance of an interleaved connector, to indicate a penetration of the secure device. In this manner, examples described herein may use capacitance changes to detect penetration attacks, such as attempted penetration of the device via removal of a panel, penetration by piercing through the interleaved connector itself, and/or penetration by removal of said connector to indicate a potential attack in progress.

Figure 1:
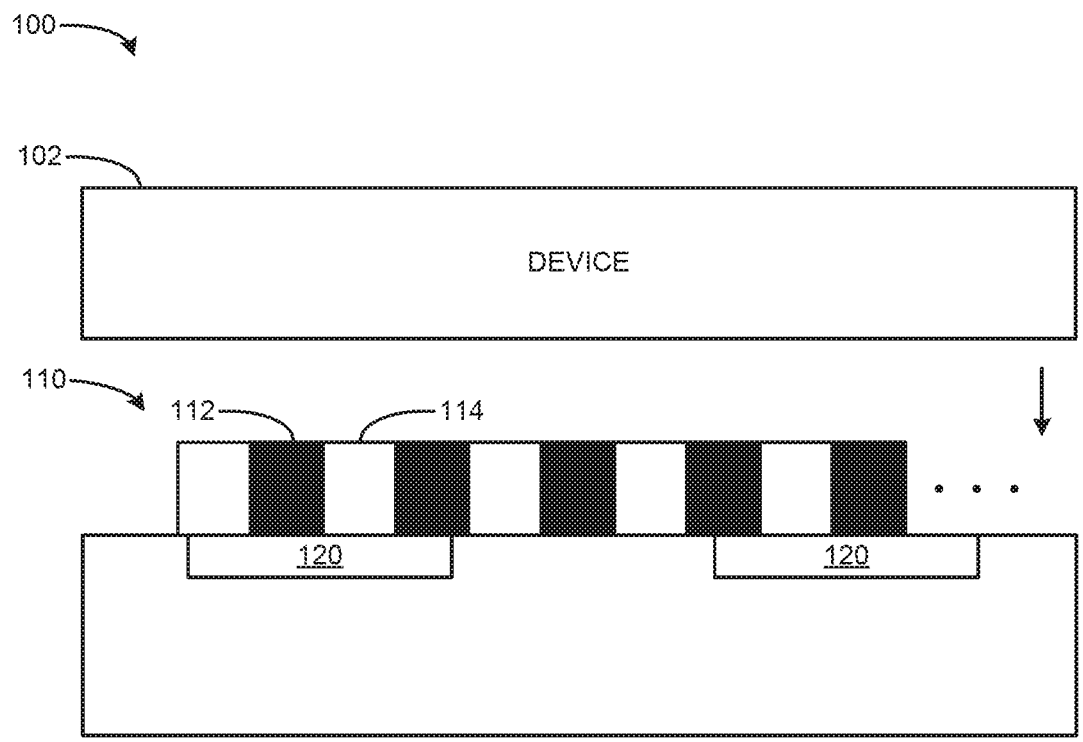
FIG. 1 is a block diagram of a system to detect a physical penetration of a secure device, including an interleaved connector according to an example.

FIG. 1 is a block diagram of a system 100 to detect a physical penetration of a secure device 102, including an interleaved connector 110 according to an example. The connector 110 is arranged such that a bottom surface of the connector 110 is disposed on a plurality of electrodes 120 (two are shown, although additional electrodes can be used). As shown, the top surface of the connector 110 is not in contact with electrodes 120 or any other electrodes. The electrodes 120 may be formed as conductive contact pads/contacts, such as copper, aluminum, or other conductive material. The connector 110 can be pressed toward the electrodes 120, e.g., by another portion of the device 102, such as a panel or other component. In an alternate example, the connector 110 can be inserted into a seam, or secured via adhesive to enable electrical contact with the electrodes 120. The connector includes interleaved layers of conductive material 112 and insulating material 114.

The connector 110 may be an elastomeric connector, such as a ZEBRA® elastomeric electronic connector. The connector 110 includes many layers of an insulator and a conductor interleaved in close proximity to each other. Although five layers of conducting material 112, and five layers of insulating material 114, are shown, example implementations may include tens, hundreds, or thousands of interleaved layers 112, 114. The connector can include layers of conductive material interleaved with an insulating material such as a rubber or elastomer matrix (including silicone rubber). The conductive material can be formed of carbon, silver, gold, and other materials/combinations. In some example implementations, a layer of conductive material 112 may be formed as finely dispersed material distributed into the insulating matrix sufficient to produce conductivity. In some alternate example implementations, a given layer of conducting material 112 can be formed by a grouping of individual wires disposed in the connector 110, aligned parallel to each other and not in contact with each other.

The connector 110 is not shown to scale, and can include layers at a much higher number and/or density than the illustrated ten layers. In some example implementations, the layers of conducting material 112 can be distributed at a density of hundreds or thousands of layers per inch. The electrodes 120, positioned as shown to include a plurality of conducting and/or insulating material layers between the electrodes 120, can be used to identify capacitive characteristics of the connector 110. Accordingly, when the device 102 is assembled and force is applied to the connector 110, the electrodes 120 can be used to identify (e.g., by a controller, not shown in FIG. 1) a first capacitance associated with proper installation. If disturbed (e.g., disassembly of the device 102, damage to and/or removal of the connector 110), the electrodes 120 can identify a change to the first capacitance, e.g., by the capacitance exceeding a threshold value. The deviation from threshold value can thereby be used to quickly identify that a breach of the device 102, into a protected region of the system 100, is occurring. Because the connector 110 includes such a substantial number of layers, even a very slight disturbance/deformation of the connector 110 can be detected. Even pushing the connector 110 results in a detectable change, due to deformation. However, drilling through the connector 110 also results in a detectable change, without deformation of the overall shape of the connector 110. Thus, the system 100 can be used to detect various different types of breaches. For example, the device 102 can squeeze the connector 110 vertically, causing the connector to slightly bulge laterally. The large number of layers are then spaced further apart, accumulating a detectable change in capacitance. Accordingly, the nature of the connector 110 and substantially high number of interleaved layers of conductive material 112 together produce a synergistic effect that is greater than merely incrementally adding an additional layer, because the density of the layers exceeds a threshold needed to produce a detectable change due to even very minimal disturbances of the connector 110. Additionally, because the layers can be spaced so closely together, even a pinhole disturbance can be detected, because the conductive layers can be spaced closer together than the width of a pin. Furthermore, the layers of conductive material 112 accommodate misalignment or other shifts in components (e.g., due to manufacturing tolerances, assembly errors, and the like).

The connector 110 can be arranged relative to the electrodes 120 as shown, with the layers of conductive material 112 arranged vertically, parallel to the direction in which the connector 110 will be compressed when installed in the device. Note that the conductors 120, as shown in the example implementation of FIG. 1, do not form a circuit between each other directly through a given layer of conductive material 112. Rather, the electrodes 120 are spaced from each other along a distance running perpendicular to the arrangement of the layers of conductive material 112. In some alternate example implementations, such spacing between the electrodes 120 can be achieved even if the electrodes 120 do not share the same side/surface of the connector 110. For example, one of the electrodes 120 can be disposed toward the left of the bottom surface of the connector 110, and another of the electrodes 120 can be disposed toward the right of the top surface of the connector 110, in addition to being disposed on other sides/surfaces of the connector 110.

Dimensions of the connector 110 can be tailored to fit the device 102. Elastomeric connectors 110 provide a shock absorption effect (e.g., damping sounds and vibration from removable panels of the device 102), and can create a gasket-like seal between surfaces of the device 102. The connector 110 can be tailored to enable a desired level of deformation/compression (e.g., 10-20% compression/reduction in height) to provide good contact with the electrodes 120.

The electrodes 120 can be spaced from each other at an arbitrary distance without a need for precise alignment, because connectors 110 can accommodate misalignments the circuit boards by virtue of the substantially high number of finely spaced layers of conducting material 112. Similarly, the electrodes 120 can be of varying dimensions, so long as they can be in contact with one or more of the layers of conducting material 112 (e.g., it is not needed for the electrodes 120 to contact a select/specific one of the layers 112). In an example implementation, a given electrode 120 can be in electrical contact with tens, hundreds, or thousands of the layers of conducting material 112. The electrodes 120 can be spaced from each other to allow a sufficient number of layers of conducting material 112 to provide good capacitance readings. In an example implementation, the electrodes 120 can be separated by a distance greater than that of ten layers of conducting material 112. Wider electrodes 120 enable redundancy of electrical connection and accommodation of alignment intolerance. Because the electrode 120 is wider than the distance between layers of conducting material 112, the electrode 120 is able to contact multiple ones of the layers of conducting material 112, ensuring good/redundant electrical contact. Assembly/manufacturing difficulty and cost are greatly reduced, by eliminating a need for precise alignment of components, while providing enhanced penetration detection.

Figure 2:
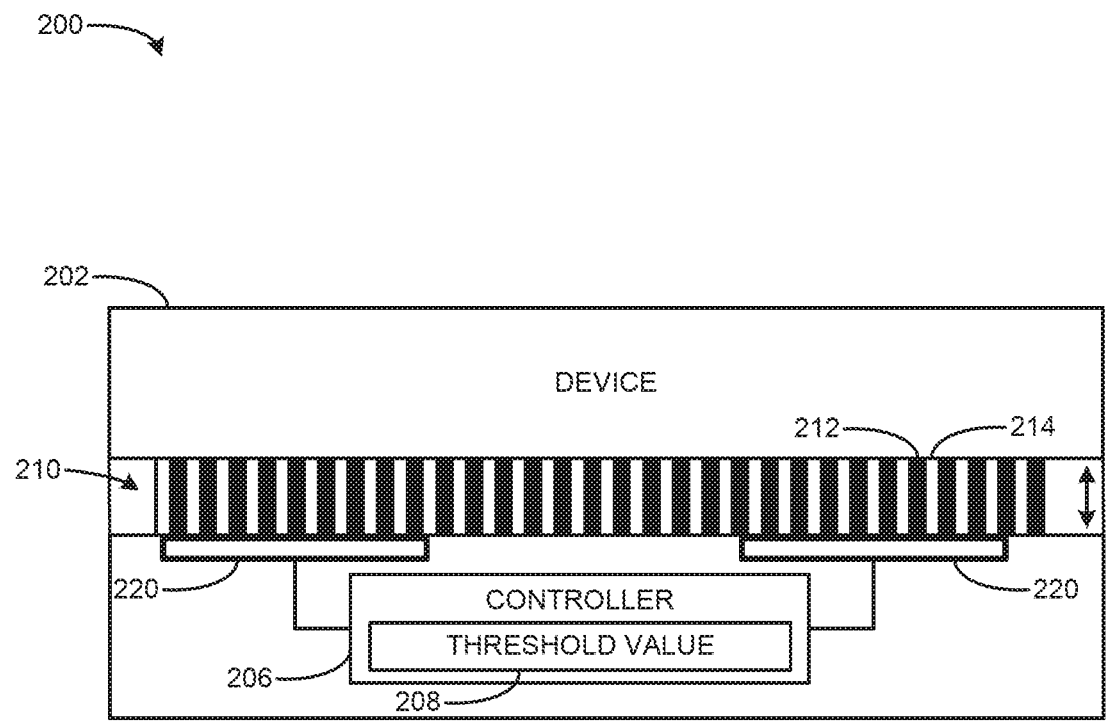
FIG. 2 is a side view block diagram of a system to detect a physical penetration of a secure device, including an interleaved connector according to an example.

FIG. 2 is a side view block diagram of a system 200 to detect a physical penetration of a secure device 202, including an interleaved connector 210 according to an example. The connector 210 includes a plurality of interleaved layers of conducting material 212 and insulating material 214. A plurality of electrodes 220 are in contact with at least a portion of the layers of conducting material 212 of the connector 210. The electrodes 220 are coupled to controller 206, which uses a threshold value 208 to identify whether a penetration/breach has occurred.

The connector 210 is shown between an upper portion of the device 202, such as a housing/panel, and a lower portion such as a chassis. The device 202 can include a recess for receiving and alignment of the connector 210. Sides of the recess can include spacing to accommodate lateral expansion of the connector 210 when compressed. The connector 210 can receive a compression along a vertical direction, which is substantially parallel to the orientation of the layers of conducting material 212.

The controller 206 can identify changes in capacitance via the electrodes 220, and can distinguish between changes associated with penetration as well as changes over time due to aging. The controller 206 can identify changes in capacitance from one time period to the next, and can self-calibrate to aging of the components in the system to accommodate changes in the absolute values of capacitance. In some example implementations, the controller 206 can identify a capacitance delta from one reading to the next, and determine whether the delta is below the threshold value 208. Thus, the threshold value 206 can be used as a baseline to establish whether a change in capacitance corresponds to a breach or drift over time. The threshold value 208 can accommodate characteristics of different connectors 210. For example, a first type of connector 210 may be associated with a first rate of drift in capacitance over time and a corresponding adjustment to threshold value 208, and a second type of connector 210 may be associated with a second rate of drift in capacitance over time and a corresponding adjustment to threshold value 208.

Figure 3:
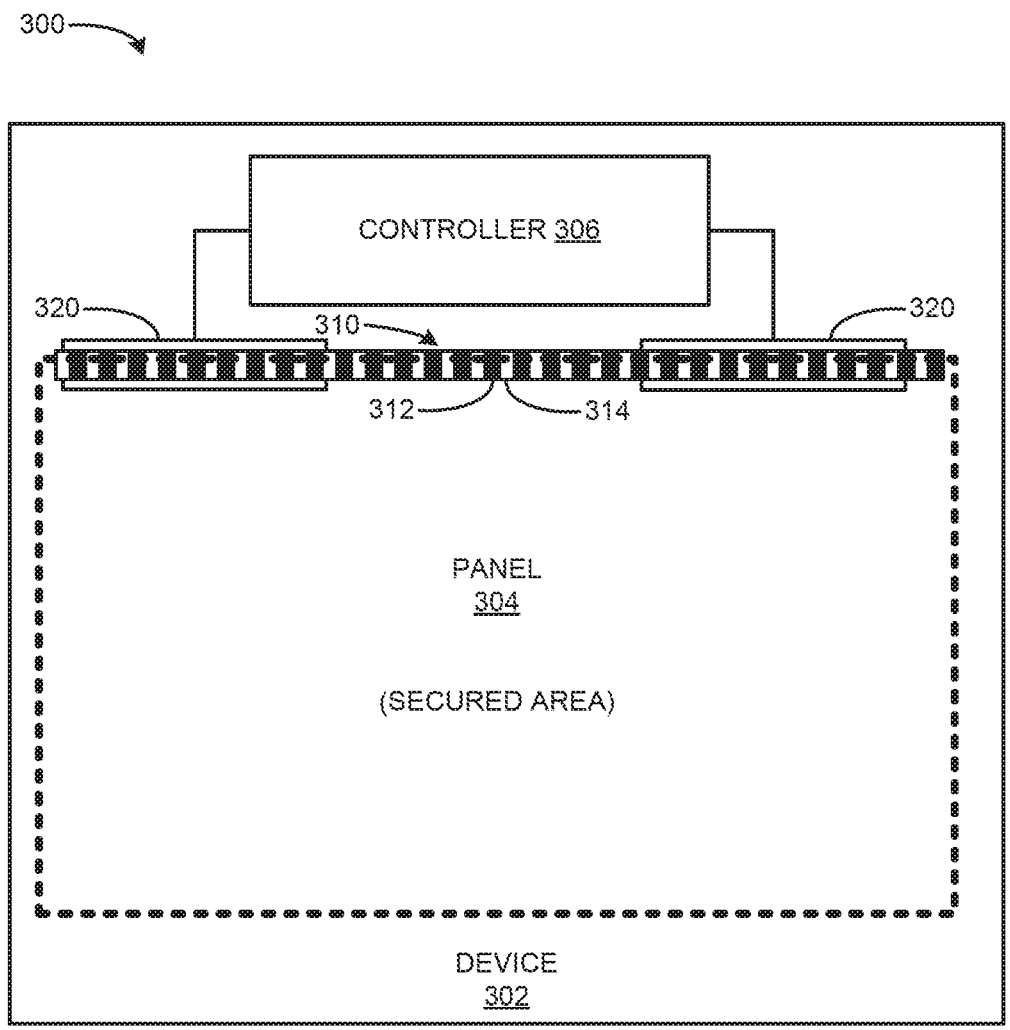
FIG. 3 is a top view block diagram of a system to detect a physical penetration of a secure device, including an interleaved connector according to an example.

FIG. 3 is a top view block diagram of a system 300 to detect a physical penetration of a secure device 302, including an interleaved connector 310 according to an example. The device 302 includes a removable panel 304 to access a secured area of the device 302. Electrodes 320 are coupled to the connector 310, which includes interleaved layers of conducting material 312 and insulating material 314. The electrodes 320 also are coupled to controller 306, which can identify penetration of the secured area of the device 300 based on capacitance of the connector 310.

As illustrated in FIG. 3, the panel 304 includes one connector 310 arranged on one side of the panel 304. The panel 304 may be coupled to the device 300 via a hinge, such that disturbance of the panel 304 is transmitted through changes in capacitance of the connector 310. In alternate examples, the device 300 can include a plurality of connectors 310 (and corresponding plurality of electrodes 320) on a given side, and may include connectors 310 on multiple different sides/sidewalls of the panel 304. Connectors 310, and corresponding electrodes 320, may be used to completely surround the panel 304. Additional electrodes 320 may be daisy-chained together, e.g., by electrically coupling one set of electrodes to the next. Alternatively each set of electrodes 320 may be coupled to the controller 306.

Figure 4:
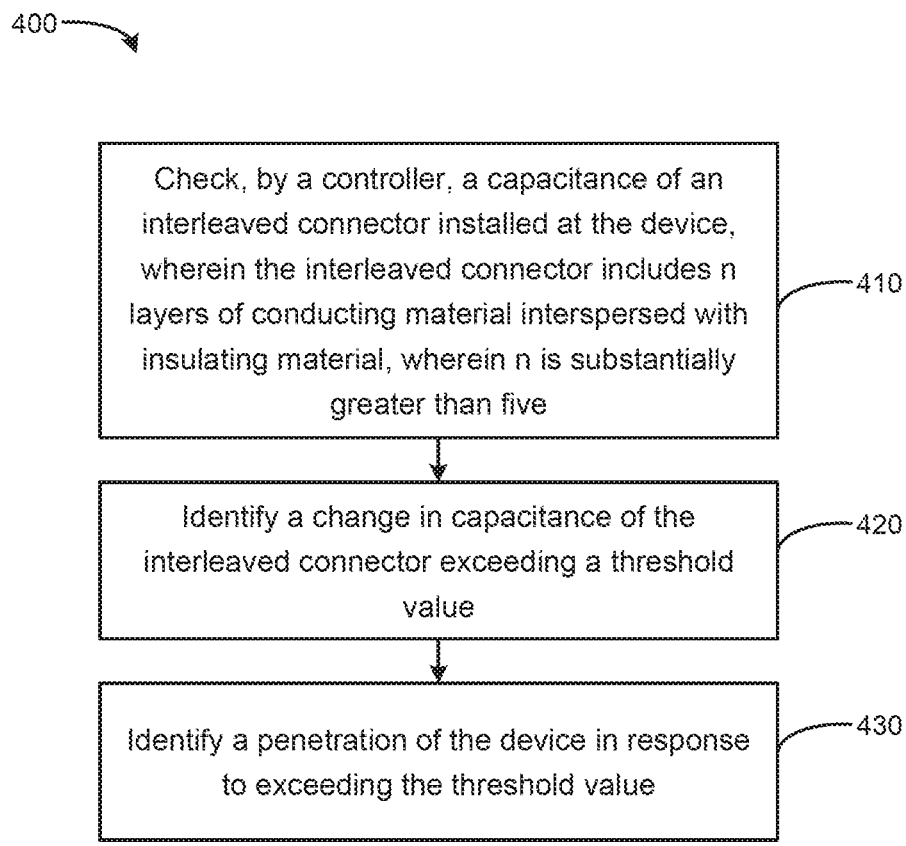
FIG. 4 is a flow chart based on identifying a physical penetration of a secure device according to an example.

Referring to FIG. 4, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on identifying a physical penetration of a secure device according to an example. In block 410, a controller is to check a capacitance of an interleaved connector installed at the device. The interleaved connector includes a substantial number of layers of conducting material interspersed with insulating material. For example, the interleaved connector includes substantially on the order of tens of layers of conducting material, far in excess of the number of electrodes used to monitor changes of capacitance in the interleaved connector. The substantial number of layers of conducting material enable the electrodes to identify very minute disturbances in the interleaved connector, based on corresponding changes in capacitance. In block 420, a change in capacitance is identified of the interleaved connector exceeding a threshold value. For example, a controller can determine that the capacitance change corresponds to penetration of the secure device based on exceeding the threshold value. The controller can also distinguish and compensate for changes in capacitance over time due to aging of components, e.g., by adjusting the threshold value over time. In block 430, a penetration of the device is identified in response to exceeding the threshold value. For example, a controller can read the capacitance via electrodes over time, and identify that the change in capacitance is raped and not due to aging, based on the capacitance change exceeding the threshold value within a time limit.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a penetration identification engine to identify a penetration of a device, wherein the engine(s) include any combination of hardware and/or software to execute the instructions described herein. As used herein, the controller/processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system to detect a physical penetration of a secure device, comprising:
    an interleaved connector including a plurality of layers of conducting material interspersed with insulating material, wherein the interleaved connector is to be installed on the secure device; and
    a plurality of electrodes to identify a change in capacitance of the interleaved connector to indicate a penetration of the secure device;
    wherein a plurality of layers of conducting material are in contact with a given one of the plurality of electrodes.

2. The system of claim 1, wherein the n layers of conducting material are oriented substantially parallel to each other and to a direction of compression experienced by the interleaved connector when installed.

3. The system of claim 1, wherein a given electrode is to be in contact with a plurality of conductive layers of the installed interleaved connector, and wherein the electrodes are separated from each other along a direction perpendicular to an orientation of the conductive layers and a direction of compression experienced by the interleaved connector when installed.

4. The system of claim 1, wherein the electrodes are separated from each other by a distance that is substantially over ten times a distance between adjacent ones of the layers of conducting material of the interleaved connector.

5. The system of claim 1, wherein a width of a given electrode is substantially wider than a distance between adjacent ones of the layers of conducting material such that a given electrode is electrically coupled to a plurality of layers.

6. The system of claim 1, wherein the plurality of layers of conducting material interspersed with insulating material are arranged at a density of substantially 100 layers per inch and higher.

7. The system of claim 1, wherein the interleaved connector includes elastomeric conducting layers interspersed with elastomeric dielectric layers.

8. The system of claim 1, wherein the interleaved connector is an elastomeric connector.

9. The system of claim 1, further comprising a controller to check the capacitance over time to identify whether a change in capacitance exceeds a threshold value to indicate a physical penetration, and to self-calibrate to adjust the threshold value over time to compensate for capacitance drift over time due to aging of components.

10. The system of claim 1, wherein the system is to comply with physical security requirements of at least one of i) a payment card industry (PCI), and ii) a federal information processing standard (FIPS), regarding physical security around a portion of the system dealing with encrypted data.

11. A system to detect a physical penetration of a secure device, comprising:
    an interleaved connector including a plurality of layers of conducting material interspersed with insulating material, wherein the interleaved connector is to be installed at the secure device such that the layers of conducting material extend parallel to each other along a direction substantially parallel to a direction of compression to be experienced by the interleaved connector when installed; and
    a plurality of electrodes to identify a change in capacitance of the interleaved connector to indicate a penetration of the secure device.

12. The system of claim 11, wherein a first electrode is to contact a first plurality of layers of conducting material, and a second electrode offset from the first electrode is to contact a second plurality of layers of conducting material different than the first plurality of layers of conducting material, wherein a third plurality of layers between the first electrode and the second electrode are not in contact with the first electrode and are not in contact with the second electrode.

13. The system of claim 12, wherein the layers of conducting material extend to at least one same surface of the interleaved connector, and wherein the first electrode and the second electrode are to contact the first and second pluralities of layers of conducting material of the interleaved connector to share a given one of the at least one same surface of the interleaved connector.

14. A method to detect a physical penetration of a secure device, comprising:
    checking, by a controller, a capacitance of an interleaved connector installed at the secure device, wherein the interleaved connector includes n layers of conducting material interspersed with insulating material, wherein n is substantially greater than five;
    identifying a change in capacitance of the interleaved connector exceeding a threshold value; and
    identifying a penetration of the secure device in response to exceeding the threshold value.

15. The method of claim 14, further comprising adjusting the threshold value over time to self-calibrate and compensate for capacitance drift over time due to aging of components.

* * * * *